United States Patent [19]
Gandola et al.

[11] Patent Number: 5,678,086
[45] Date of Patent: Oct. 14, 1997

[54] PATTERNED MULTI-TRACK THIN FILM HEADS FOR IMAGE AREA RECORD/ REPRODUCE ON MAGNETICS-ON-FILM

[75] Inventors: Kent Raphael Gandola, Carlsbad; Wlodzimierz Stanley Czarnecki, Rancho Santa Fe; Peter VanderSalm Koeppe, San Diego, all of Calif.

[73] Assignee: Eastman Kodak Company, Rochester, N.Y.

[21] Appl. No.: 681,019

[22] Filed: Jul. 22, 1996

Related U.S. Application Data

[60] Provisional application No. 60/006,476 Nov. 13, 1995.
[51] Int. Cl.⁶ .............. G03B 17/24; G11B 5/187; G11B 5/147
[52] U.S. Cl. .............. 396/319; 360/122; 360/126
[58] Field of Search .............. 360/104, 109, 360/110, 119, 120, 121, 122, 126; 396/310, 319, 320, 321

[56] References Cited

U.S. PATENT DOCUMENTS

| | | | |
|---|---|---|---|
| 4,439,793 | 3/1984 | Nater | 360/121 |
| 4,669,016 | 5/1987 | Schmid et al. | 360/122 |
| 4,910,629 | 3/1990 | Mitsubishi et al. | 360/121 |
| 4,933,780 | 6/1990 | Wash et al. | 360/1 |
| 4,977,419 | 12/1990 | Wash et al. | 354/76 |
| 5,034,836 | 7/1991 | DeMarti, Jr. et al. | 360/104 |
| 5,041,933 | 8/1991 | DeMarti, Jr. et al. | 360/104 |
| 5,146,378 | 9/1992 | Makino et al. | 360/121 |
| 5,258,883 | 11/1993 | Ruigrok | 360/113 |
| 5,276,472 | 1/1994 | Bell et al. | 354/76 |
| 5,291,363 | 3/1994 | Somers | 60/113 |
| 5,502,528 | 3/1996 | Czarnecki et al. | 396/319 |

*Primary Examiner*—Safet Metjahic
*Assistant Examiner*—Nicholas J. Tuccillo
*Attorney, Agent, or Firm*—William F. Noval

[57] ABSTRACT

Magnetic recording and reproducing linear thin film head arrays particularly for use for recording and reading information on a magnetics-on-film (MOF) layer in the image area of photographic filmstrips and particularly a configuration and mounting of such heads to achieve high compliance with the relatively stiff filmstrip and MOF layer in cameras or other filmstrip handling apparatus without damaging the filmstrip. When constrained in the film transport path, the filmstrip assumes a convex cross film curvature on the MOF layer side approximated by a sixth order polynomial having even terms only. A base line for the deposition of thin film head layers of each head of the array on a linear substrate is approximated by the sixth order polynomial having even terms only. After deposition of the thin film layers, the linear head array is shaped to the cross film curvature, and the lapped head surfaces are aligned with the base line. Preferably, at least one electrical lapping guide is deposited on the substrate in relation to the linear array of magnetic head elements and the base line, wherein the head element layer height is controlled in the head fabrication processing by monitoring the electrical resistance of the electrical lapping guide during shaping of the convex curvature of the head surface.

22 Claims, 7 Drawing Sheets

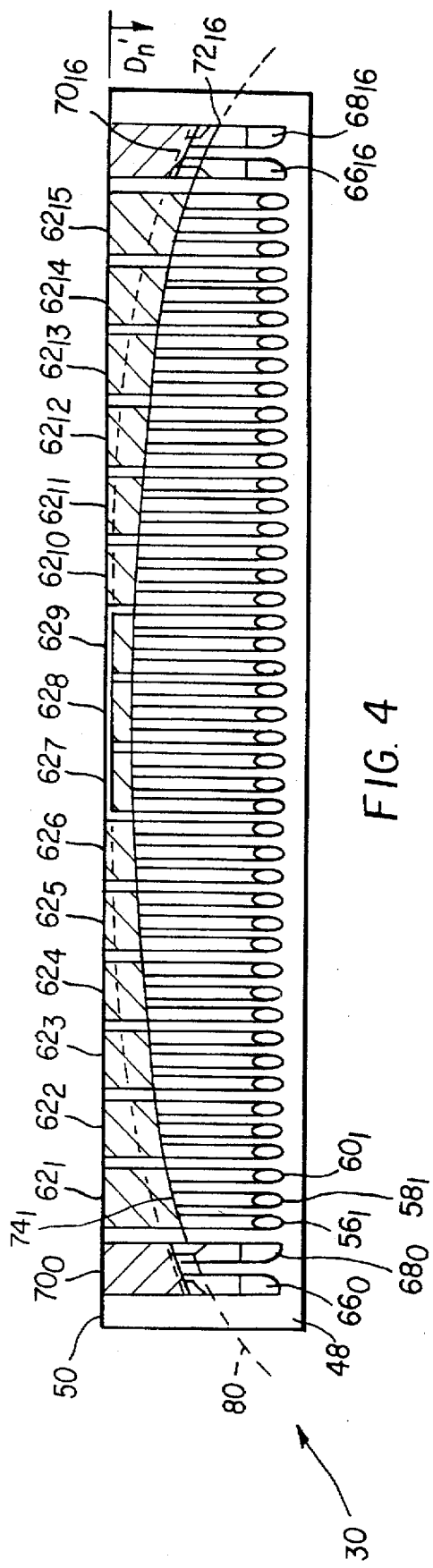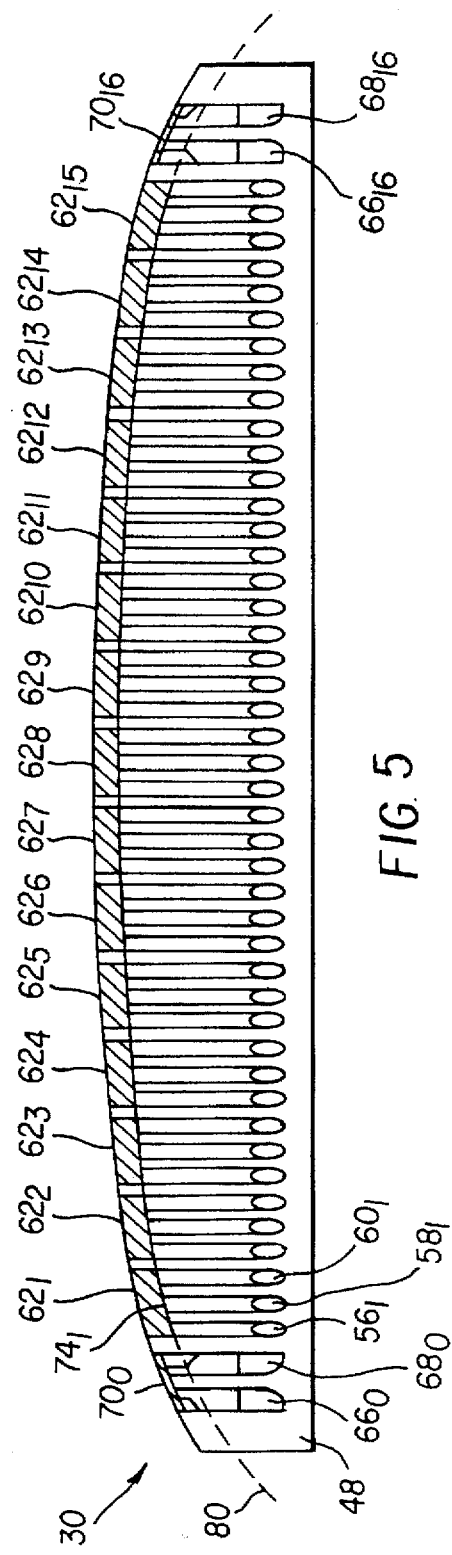
FIG. 4
FIG. 5

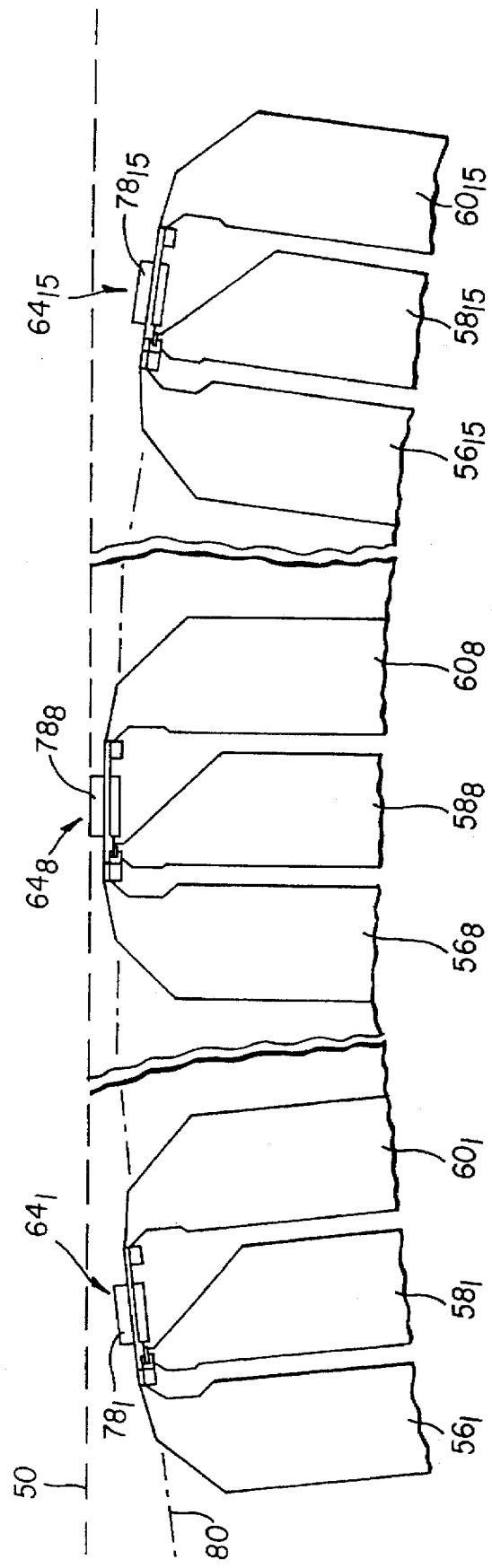

PATTERNED MULTI-TRACK THIN FILM HEADS FOR IMAGE AREA RECORD/REPRODUCE ON MAGNETICS-ON-FILM

Reference is made to and priority claimed from U.S. application Ser. No. 60/006,476, filed 13 Nov. 1995, entitled PATTERNED MULTI-TRACK THIN FILM HEADS FOR IMAGE AREA RECORD/REPRODUCE ON MAGNETICS-ON-FILM.

CROSS-REFERENCE TO RELATED APPLICATION

Reference is hereby made to commonly assigned, co-pending U.S. patent application Ser. No. 08/333,352 filed Nov. 2, 1994, by W. Stanley Czarnecki et al. entitled MAGNETICS-ON-FILM HEAD ARRAY FOR CAMERA, and Ser. No. 08/564,751, filed 29 Nov. 1995 by Neil Smith, entitled FLUX-GUIDED PAIRED MAGNETORESISTIVE HEAD.

FIELD OF THE INVENTION

This invention relates to magnetic recording and reproducing linear head arrays particularly for use for recording and reading information on a magnetics-on-film (MOF) layer in the image area of photographic filmstrips and particularly to the configuration and mounting of such heads to achieve high compliance with the relatively stiff filmstrip and MOF layer in cameras or other filmstrip handling apparatus without damaging the filmstrip.

BACKGROUND OF THE INVENTION

In commonly assigned U.S. Pat. Nos. 4,933,780 and 4,977,419, a photographic film is disclosed having a virtually transparent magnetic layer covering the non-emulsion side of the film (referred to as a magnetics-on-film or MOF layer) and dedicated recording areas or tracks on the layer for recording information such as film type, film speed, film exposure information and information relevant to the processing and subsequent use (e.g., printing) of the exposed image frames on dedicated longitudinally extending tracks. The systems disclosed therein suggest recording of information during film manufacture, reading and/or recording of information on certain tracks during camera use, and reading and/or recording of print related information during photofinishing using the MOF layer. The information may include voiced messages or sound associated with the photographed scene and may be recorded in digital or analog format on certain of the tracks.

The specific camera recording tracks and recording heads disclosed in the '419 and '780 patents are disposed to record in tracks located along the longitudinal edges of the film and outside the MOF tracks in the image frame area. The possibility of recording audio within certain tracks of the MOF layer within the image frame area is described in commonly assigned U.S. Pat. No. 5,276,472. Further commonly assigned U.S. Pat. Nos. 5,034,836 and 5,041,933 also disclose magnetic recording head configurations for use in recording in longitudinal tracks alongside the filmstrip edges but not in the image frame area.

None of the above referenced patents specifically disclose magnetic linear head arrays (i.e. multi-head arrays) for recording or reproducing in a plurality of tracks in the MOF layer on the side of the film opposite to the image frame area. Reading and recording information on tracks of a magnetic coating or stripes of magnetic coatings located in the image frame area on photographic film requires the development of a unique interface between the magnetic head and the photographic film. That interface is described in detail in the above-referenced '352 application.

The magnetic head-to-photographic film interface differs in major ways from that normally associated with a head/disk interface in a computer disk drive, a head/tape interface in a tape drive. In a computer disk drive, the head flies or floats on the air film that is created as the flat surface of the disk rotates at high speed. Contact of the magnetic head with the disk is to be avoided at all costs.

In a typical audio or video analog tape drive, the tape is flexible enough under tension to conform to the head contour both in the tape feed direction and in the cross-tape direction. The tape path typically wraps the tape over the magnetic head surface as the tape is advanced in the direction of tape advancement. Thus, the magnetic head surface is typically curved in the direction of tape transport or the direction it sweeps over the tape.

For example, linear head arrays for recording in parallel tracks of digital audio tape are described in U.S. Pat. No. 4,669,016. In the multi-head magnetic head array of the type shown in the '016 patent, a narrow arcuate head surface contact zone in the tape transport direction is provided in conjunction with a generally flattened arc head surface contact zone in the transverse, cross-tape direction to create grooves between the adjacent magnetic heads. The grooves are asserted to provide high contact compliance between the head surfaces and the tape, increase uniformity of wear, and also provide air ducts during high speed tape transport.

In an electronic still camera context described in U.S. Pat. No. 4,910,629, a thin film magnetic sheet or disk is rotated in a plane with respect to a magnetic recording head that is mounted to protrude into the plane to make adequate contact to locally deflect the disk as it rotates. The magnetic head is also mounted to move inward or outward in a radial direction with respect to the center of rotation of the magnetic disk to define a spiral recording track. The magnetic head surface is therefore contoured in both the spiral path and radial directions.

In a further U.S. Pat. No. 5,146,378, a multi-head, linear, thin film magnetic head array apparently for recording in closely spaced tracks on a magnetic disk is described wherein the head array is aligned in the radial direction of the disk to record in a plurality of tracks as the disk rotates. The linear head array protrudes into the disk plane and deflects it as in the case of a single or dual head of the type described in the '629 patent. In the '378 patent, the head surface is curved in a single radius arc along the length of the linear head array so that the center-most magnetic head(s) protrude further into the disk plane than the magnetic heads elements to either side. The single radius arc is appropriate to a highly flexible, thin film magnetic media that is moved past the linear magnetic head array at relatively high speed and readily conforms to the magnetic head array.

Photographic film is of much greater thickness than the magnetic tape, disk or sheet media employed in the above described systems. Typically, film has a thickness on the order of about 0.003–0.006 inches or 0.076–0.152 mm and is relatively stiff and inflexible in comparison with magnetic tape or disk media. Film is not elastically deformable in localized areas of the size, shapes and depths contemplated by the above-referenced '016, '378 and '629 patents sufficiently to achieve high enough head-to-film compliance to effect reliable recording. The magnetic tape, disk and sheet media employed with intimate head contact of the type described typically are about 0.0005–0.0010 inches or 0.013–0.025 mm thick and readily deform elastically to comply with the described head contours and penetration depths.

When removed from its cartridge, film shows a very observable cross-film curvature across its width that is convex on the non-emulsion side of the film. In addition, the unwrapped and unrestrained film also shows a convex curvature along its length, again on the non-emulsion side of the film. This latter curvature is attributed primarily to a core-set curl that results from the film having been tightly wound on a film cartridge spool.

The convex cross-film curvature across the width of the film is primarily caused by the multi-layers of emulsion and MOF (if present). These layers have different stretch properties than that of the base film substrate of acetate, PET, or PEN material. The cross-film curvature is also influenced by the bending phenomena known as anticlastic curvature. The degree of cross-film curvature depends on the time and temperature history of the film, the relative humidity, and the thickness of the film layers. Because of the cross-film curvature, it is difficult to achieve good, uniform contact or compliance across the full width of a multi-track recording head located in the image frame area.

When photographic film is wrapped around a cylindrical arc contour, as is typically used in a magnetic tape head, most of the cross-film curvature described above is reduced. However, intimate compliance of the film surface to the cylindrical or arcuate head surface is not achieved due to minute air separations or spacings caused by the stiffness of the film. If a pressure pad is applied to the emulsion side of the film in the area immediately opposite the head position, then considerable improvement can be made in reducing the film-to-head spacing. But, the use of image area pressure pad support is not favored due to potential scratching of the emulsion layer and resulting degraded photographic image quality.

The prolate ellipsoidal head contours of the linear head array, and the positioning of the head array with respect to the film transport path to effect self loading of the MOF layer against the head contours, disclosed in the above-referenced '352 application, represent a substantial improvement in stationary linear head array design. However, the contouring of the head surfaces can degrade the performance of the outermost head elements, particularly in the case of thin film record/reproduce heads.

SUMMARY OF THE INVENTION

It is therefore a primary object of the invention to enhance the compliance of a magnetic record and/or reproduce head with the MOF layer of a filmstrip for recording and/or reproducing information accurately in a plurality of tracks in the image area of the MOF layer without negatively affecting the quality of the photographic image.

The invention is realized in a first aspect in a thin film magnetic head array for recording and/or reproducing information in tracks of a magnetic layer on photographic film exhibiting a predetermined cross-film, concave curvature extending across the image frame area width of the filmstrip when the filmstrip is constrained in a film transport path for movement with respect to the magnetic head array comprising: means for defining a filmstrip transport path for constraining a filmstrip to exhibit the predetermined cross-film, concave curvature; an elongated head substrate mounted with respect to the filmstrip transport path defining means having an array length extending across the image frame area width and a head element surface adapted to contact the magnetic layer approximated by a sixth order polynomial having even terms only and complying with the convex curvature of the filmstrip constrained in the film transport path; a plurality of magnetic head elements deposited in a linear array as thin film layers on the elongated head substrate extending between a head element layer deposition base line and the head surface and having predetermined head element heights, wherein the head element layer deposition base line is approximated by a sixth order polynomial having even terms only and complying with the convex curvature of the filmstrip constrained in the film transport path.

The plurality of record/reproduce heads are fabricated in the shape of a plurality of frustums including inner frustums supporting a plurality of active head elements in an interior region in the cross film direction and at least one further outer frustum on each side of the inner frustums in the cross film direction.

Preferably, at least one electrical lapping guide is deposited on the substrate in alignment with one of the outer frustums and in relation to the linear array of magnetic head elements and in conformance with the convex curvature of the head surface, wherein the head element layer height is controlled in the head fabrication processing by monitoring the electrical resistance of the electrical lapping guide during shaping, by lapping, of the convex curvature of the head surface.

In a preferred embodiment, the magnetic head elements are preferably flux-guided paired MR or PMR head elements with flux elements at the head surfaces that may be contoured during the lapping process thereby loosening lapping tolerances.

The invention is preferably implemented within a camera where the filmstrip is transported through a camera exposure gate for exposing image frames in the photosensitive layers of the filmstrip on the opposite side of the filmstrip from the MOF layer. The invention may also be practiced in other filmstrip transport apparatus associated with film manufacture in order to pre-record information in certain tracks or in processing of the exposed filmstrips to develop the image frames or in making prints from the image frames in order to record further information in other tracks or for any other reason that it may prove useful to read information from or write information into the tracks and read or record information into selected tracks of the MOF layer.

ADVANTAGES OF THE INVENTION

In accordance with the present invention, and due to the various features thereof, an array of thin film head devices that are deposited in a pattern conforming to the curvature of the head bearing surface as defined by the cross-film curvature shape of the photographic film constrained in a film gate is achieved. The pattern enables the close gap depth (for inductive heads) or element height (for MR heads) tolerance required for thin film head structures. In addition, the uniquely shaped in process, monitoring devices (ELGs), deposited in at least one location along the array pattern base line, aid in the fabrication of the head bearing surface contour.

In use, the resulting head-to-film interface provided by the head bearing surface contour does not require emulsion side support, nor does it generate any significant surface damage to the MOF surface in the image frame area.

BRIEF DESCRIPTION OF THE DRAWINGS

These and other objects, advantages and features of the invention will be become apparent from the detailed description given hereinafter in relation to the accompanying drawings, in which:

FIG. 4 is a simplified cross-section view of a first embodiment of the thin film layers of the linear head array of FIG. 2 prior to lapping;

FIG. 5 is a simplified cross-section view of the first embodiment of the thin film layers of the linear head array of FIG. 2 after lapping;

FIG. 15 is a top view of a further section of a linear array of flux-guided PMR head layers also arranged in an exaggerated and fanned set back manner illustrating a still further implementation of the present invention.

The drawings are not necessarily to scale.

DETAILED DESCRIPTION OF THE PREFERRED EMBODIMENTS

The cross-film curvature of a film or filmstrip manifests itself when the filmstrip is attempted to be flattened for transport through a camera exposure gate or a transport path of photofinishing equipment by restraining the film edges. In the transport of filmstrips through a straightened transport path, contact on either side of the film in the image frame area is avoided to minimize the possibility of scratching that area and degrading the photographic filmstrip.

Figure 1:
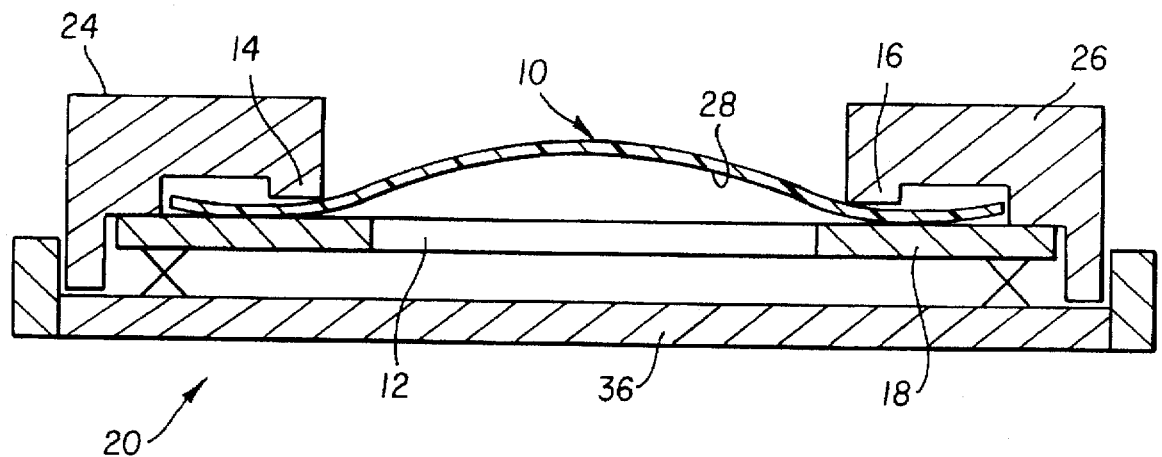
FIG. 1 is a perspective view of a camera or other photographic equipment film rail and gate frame for constraining a filmstrip in a film transport path.

FIG. 1 depicts in exaggerated scale, the cross-film curvature of a film or filmstrip 10 that occurs when the core set longitudinal curl is straightened out by guidance and constraint of the longitudinal edges of filmstrip 10 in a film rail and gate frame 20 providing a filmstrip transport path. Gate frame 20 has parallel film rails 14 and 16 formed in a elongated channels 24 and 26 closely spaced from a spring biased backing plate 18. As shown in FIG. 1, the backing plate 18 is spring biased away from a base plate 36 and is formed with an opening 12 for mounting a linear magnetic head array of the present invention to record or reproduce information in a plurality of linear tracks extending lengthwise in the filmstrip image frame area.

In the context of a camera, the filmstrip 10 is intended to extend between the film rails 14, 16 and gate frame 18 from a supply side, across the camera exposure gate and to a take-up side. In photographic equipment, e.g. a photographic printer or a preparation station, the filmstrip 10 is intended to extend between the film rails 14, 16 and gate frame 18 from a supply reel, across an image frame scanning station and to a take-up side. The design of such compact still camera and photographic equipment film transport paths and mechanisms is well known in the art.

In either case, the MOF layer 28 on the concave side of filmstrip 10 also bears against the linear magnetic head array of the present invention in the manner described in further detail in the above-referenced '352 application, for example. The filmstrip is not deformed by the linear head array. Instead, the inherent stiffness of the filmstrip when constrained as depicted provides a loading force against the shaped head elements of the linear head arrays of the preferred embodiments of the invention. As described therein, a high degree of compliance is achieved without resorting to any additional tension on the filmstrip 10 or the use of a backing plate or roller or the like to apply pressure or load to the emulsion layer side of the filmstrip 10. In this regard, the linear magnetic head array penetrates the film path a minute depth to create a uniform wrap angle of between 0.5° to 4.5° of the leading and trailing filmstrip wrapped around the linear head array within the opening 12. This ensures that a narrow region of contact between the filmstrip MOF layer 28 and the linear magnetic head array is directly over each magnetic head element.

The resulting spring load against the head bearing surface is sufficient to generate a pressure contact at the interface of less than 30 PSI (21 kPa). Because of this natural spring load, no media (i.e., film) tension is required to establish and maintain a robust interface, and the compliance is furthermore enhanced once a pulse of tension is applied to the filmstrip to provide frame stepping motion, in camera applications.

Figure 2:
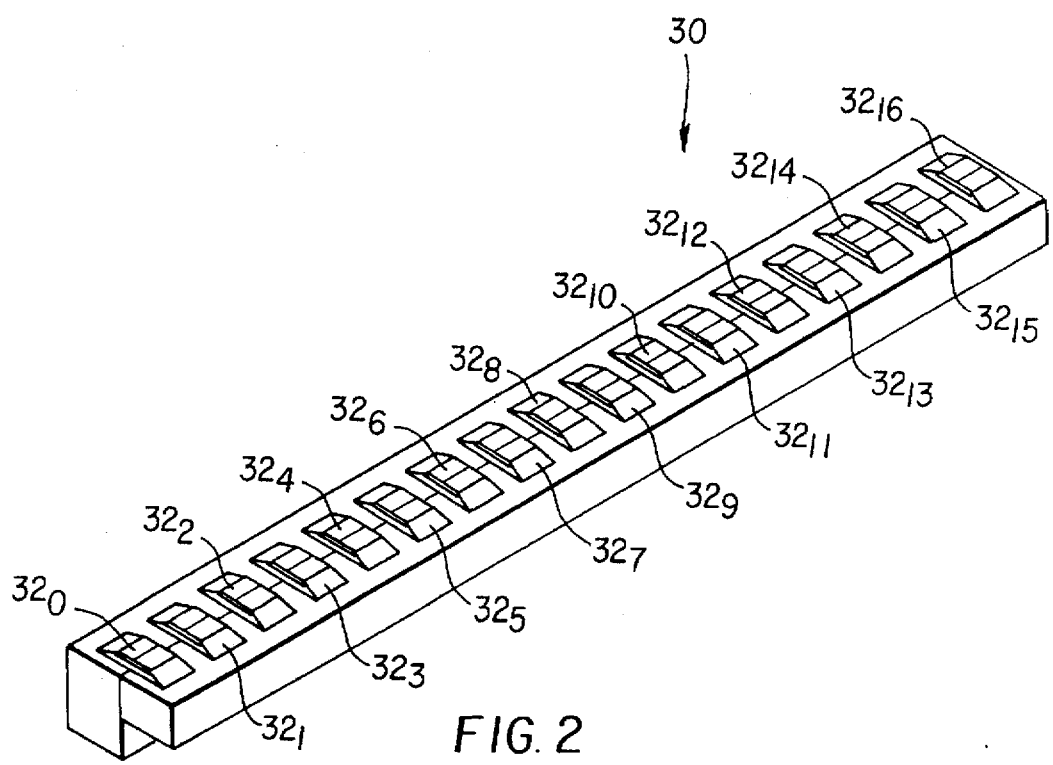
FIG. 2 is an illustration of a linear magnetic head array of thin film magnetic head elements having head surfaces machined into frustums.

Turning now to FIG. 2, it depicts a linear magnetic head array 30 of thin film magnetic head elements and dummy head/electronic lapping guides (ELGs) having surfaces machined into the shape of n=17 frustums $32_0$–$32_{16}$. The magnetic head array 30 is preferably formed of either thin film inductive magnetic head elements or thin film magnetoresistive (MR) head elements comprising fifteen active inductive head gaps or MR head defining layers, depending on the head type, and two outermost dummy head/ELG resistors formed in head frustums $32_0$ and $32_{16}$ as described in greater detail below.

The head array therefore can track fifteen tracks on the MOF layer 28 of the filmstrip 10. In use, the magnetic head array 30, fabricated as described below, can be supported on a head stepping mechanism to step the head array between two positions to track a total of 30 tracks in the MOF layer.

Figure 3:
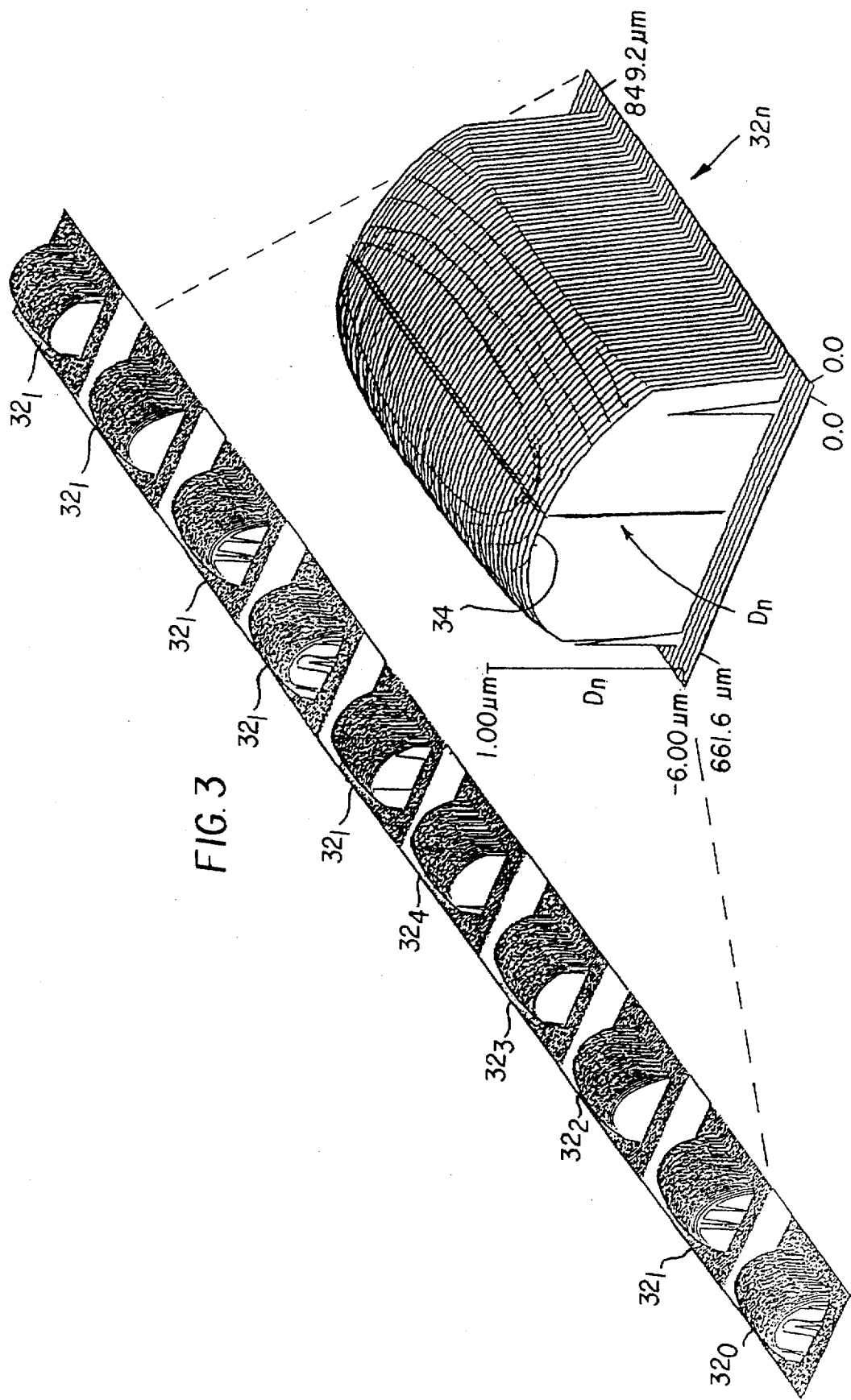
FIG. 3 is a computer drawn perspective view of the large radius, prolate ellipsoidal shapes on the tops of the frustums of the magnetic head arrays of the first and second embodiments after lapping.

The frustums $32_0$–$32_{16}$ have relatively sharp machined edges in both directions and are lapped in accordance with the present invention to provide the preferred magnetic head-to-film interface that enables near-contact compliance around each individual head gap and across the full multitrack head array width as disclosed in the above-referenced '352 application. A resulting prolate ellipsoidal contour (as in an upper surface of a football lying on its side) is effected by in-situ lapping of the frustums $32_0$–$32_{16}$ of each head element/ELG surface to match the convex cross-film curvature of the photographic film at the site where the filmstrip contacts the particular head element surface in the linear head array 30. FIG. 3 depicts an example of the resulting prolate ellipsoidal head contour 34 of one of the head element frustums $32_n$.

The frustums $32_0$–$32_{16}$ are lapped in a fixture mimicking the film transport path of FIG. 1 by mounting the linear head array 30 in its intended position of use and advancing a photographic film having an abrasive tape applied to the facing film surface through the transport path. After a length of the abrasive tape/film sandwich is passed over the linear head array, all of the initial high pressure points of contact of the frustums $32_n$ are abraded down so that the resulting head and ELG surfaces are contoured to bear relatively equivalent pressures or loads.

The in-situ lapping process produces two contour features: 1) a large radius, prolate ellipsoidal shape on the bearing surfaces of the individual frustums that minimizes film damage as shown in FIG. 3; and 2) the convex cross-curvature across the multi-track head width as shown, for example, in FIGS. 5 and 10, described below. In this process, the heights $D_n$ of the head gaps or thin film layers are made relatively equal.

Figure 10:
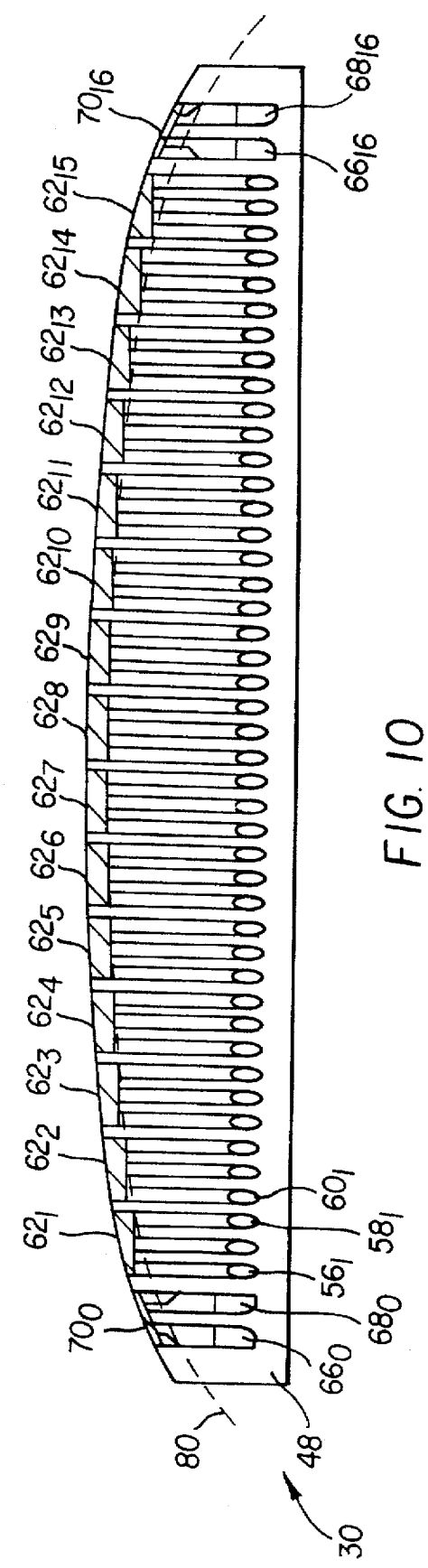
FIG. 10 is a simplified cross-section view of the second embodiment of the thin film layers of the linear head array of FIG. 2 after lapping.

In experiments conducted, a 24 mm wide film of 100 μm thickness, interposed with a 25 μm-thick diamond abrasive tape, produced the multi-track linear head array convex cross-curvature of FIG. 3 (and FIGS. 5 and 10). The regions of highest lapping down are noted to be on the surfaces of outermost ELGs and head elements closest to the gate rails, i.e. those having the starting frustums $32_0$–$32_3$ and $32_{13}$–$32_{16}$. This result reflects the fact that the initial highest pressure points on the linear head array bearing surfaces are focused on these outermost head frustums which are closest to the concave surface of the abrading tape/film.

The multi-track head contour of FIG. 3 (and FIGS. 5 and 10) conflicts with the tight tolerance range (e.g., ±0.5 microns) that is required on height dimension $D_n$ of most thin film inductive gaps and MR layers. Thin film magnetic head elements of linear head arrays are typically deposited on a support substrate in straight row and column arrays using photo-lithographic processes. The substrates are then cut into rows to benefit from the economies of batch manufacturing. The rows are machined flat and planar down their lengths to within, for example, ±0.5 micron of the target gap depth or element height dimension. Having thin film head elements deposited in a straight row, and then attempting to apply the aforementioned in-situ lapping process, would damage those head elements located in the outer ends of the linear head array where the contour cross-curvature is the most extreme.

To alleviate this problem, in accordance with the present invention, the thin film head elements are deposited onto the support substrate along a setback line 80 (depicted in the first embodiment of FIGS. 4 and 5, for example) that is curved corresponding to the convex cross-film curvature exhibited in FIG. 1. The ELG resistor layers $70_0$ and $70_{16}$ and the adjacent MR head element record/reproduce layers or the inductive gaps, depending on the head type, referred to as head defining layers $62_1$–$62_{15}$ for convenience, located near the two ends of the linear head array 30 are set back by a set back distance y(x) varying as a function of the distance x along the length or axis with respect to the center of the linear head array 30. In this manner, when the multi-track linear head array 30 is fabricated, the head surface cross curvature requirement and the head gap depth or MR element height $D_n$ can be met simultaneously.

Unlike the teaching in the above-referenced '378 patent, the setback line curve of the present invention differs from a simple arc section of a circle characterized therein as an "approximately elliptic spherical shape". The cross-film curvature is a more complex curvature approximated by a sixth order polynomial equation having even terms, i.e.:

$$y(x)=a_0+a_2x^2+a_4x^4+a_6x^6,$$

wherein:

$a_0$ is a constant distance from a reference point along the center axis of the array $a_2$=$-3.15\times10^{-4}$ to $-2.11\times10^{-4}$ mm$^{-1}$ $a_4$=$6.50\times10^{-6}$ to $9.41\times10^{-6}$ mm$^3$ $a_6$=$-1.59\times10^{-7}$ to $-1.297\times10^{-7}$ mm$^5$ The values for $a_2$, $a_4$, $a_6$ are derived empirically from 24 mm wide photographic film constrained as illustrated in FIG. 1. These values may differ for film having a different width, e.g. 35 mm film.

FIG. 4 is a simplified cross-section view along the linear axis of a first embodiment of the linear head array 30 of FIG. 2 to show the thin film layers thereof prior to the machining of the ELG and head frustums $32_0$–$32_{16}$ and lapping in accordance with FIG. 3. FIG. 5 is a similar simplified cross-section view along the linear axis of the linear head array 30 of FIG. 4 after lapping. In FIGS. 4 and 5, the ELG resistor layers 70$_0$ and 70$_{16}$ and the head defining layers $62$–$62_{15}$ are evenly spaced in the +x and -x array position directions along planar substrate surface 50 on either side of the center of the array substrate 48. For example, as shown in FIG. 5, the set back distance $y_1$ is derived as a function of the array position distance $x_1$, and the set back distance $y_2$ is derived as a function of the array position distance $x_2$.

The magnetic head array type depicted in the exemplary embodiment of FIGS. 4 and 5 may be of any of the known thin film types. The invention is preferably implemented in a Paired MR (PMR) head structure of the type described in the above-referenced U.S. Ser. No. 08/564,751 application, and as described below. Three leads $56_n$, $58_n$, $60_n$ are depicted extending away from each respective head defining layer $62_n$. The head defining layers $62_n$ are a simplification of an actual PMR head structure having the MR layers coupled to the leads $56_n$ and $58_n$ and both MR layers coupled in common to the lead $60_n$ as described below with respect to FIG. 14.

A simple MR head would have only one MR layer and a pair of deposited leads. A thin film inductive head (wherein the head defining layer is the head gap) would also have a pair of leads to a field creating structure. An integrated inductive record head and MR reproduce head would have four such deposited leads, and an integrated inductive record head and PMR reproduce head would five such deposited leads. FIGS. 4 and 5 are intended to be illustrative of any of theses specific head structures.

The leads $56_n$, $58_n$, $60_n$ and head defining layers $62_n$ are deposited on the substrate 48 in accordance with conventional MR head deposition technology. Similarly, leads $66_0$, $66_0$ extend from ELG resistor layer $70_0$, and leads $66_{16}$, $68_{16}$ extend from ELG resistor layer $70_{16}$. The leads $66_0$, $66_0$ and the ELG resistor layer $70_0$ are also deposited on the substrate 48 in accordance with conventional deposition technology.

The deposition of each head defining layer $62_1$–$62_{15}$ and ELG resistor layer $70_0$ and $70_{17}$ is therefore in an arc pattern that results in a set back distance $x_n$ from planar substrate surface 50 appropriately to maintain the head element height $D_n$ for each head defining layer $62_n$ within a prescribed tolerance range after lapping as illustrated in FIG. 5. The pattern of set back line 80 is derived from the sixth order polynomial equation y(x).

In this embodiment, the deposited thin film head defining layers $62_n$ are curved on the interior edge deposition base lines $74_n$ to follow set back line 80 to correlate with the cross-film curvature approximated by the sixth order polynomial equation.

Figure 9:
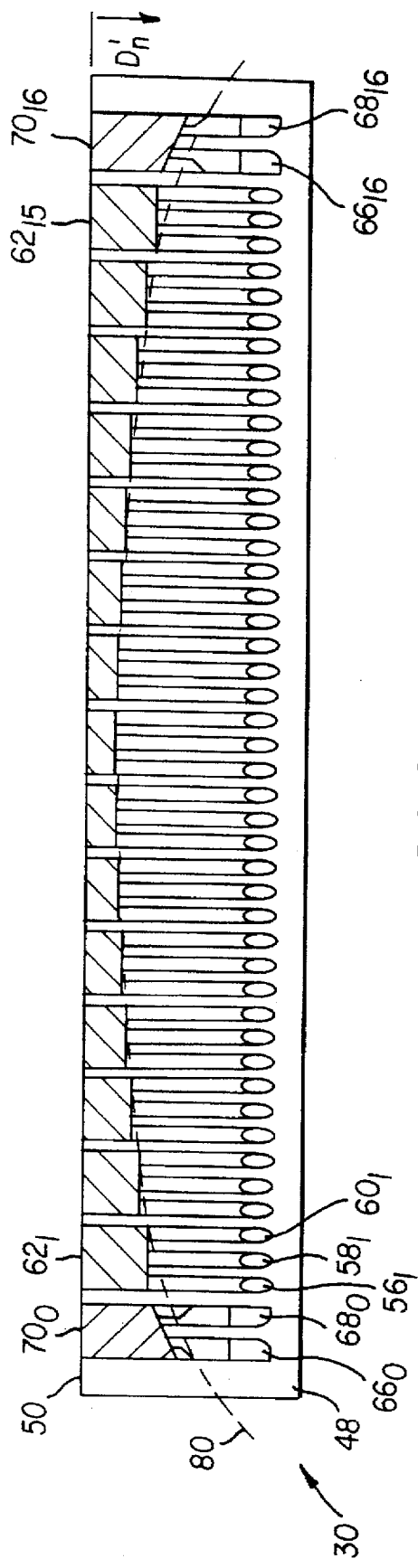
FIG. 9 is a simplified cross-section view of a second embodiment of the thin film layers of the linear head array of FIG. 2 prior to lapping.

FIGS. 9 and 10 are plan views similar to FIGS. 4 and 5 of another embodiment of a thin film MR or inductive head pattern having the deposited head defining layers $62_n$ stepped in straight line interior edge deposition base lines $76_n$ to approximately follow the tangents of set back line 80 in a curved pattern to correlate with the cross-film curvature approximated by the sixth order polynomial equation y(x). It will be understood that the individual head element surface contours of FIG. 10 follow the prolate ellipsoid contours of FIG. 3 in both the longitudinal and transverse directions.

The tolerance on the gap depth or element height $D_n$ can be maintained for all head defining layers $62_n$ by incorporating either the arc base line or step base line deposition pattern, or both, on a thin film head substrate that is to be in-situ lapped and contoured. When both are incorporated, for example, the straight line interior edge deposition base lines $76_n$ may be employed for the innermost head defining layers $62_n$, and the curved interior edge deposition base lines $74_n$ may be used for the outer head defining layers $62_n$ and the ELG resistor layers $70_0$ and $70_{16}$.

In the above-described embodiments, the patterns of layers forming each of the magnetic head elements and the ELGs are laid out in parallel. For example, the leads $56_n$, $58_n$, $60_n$ and head defining layers $62_n$ and the leads $66_0$, $66_0$ and $66_{16}$, $68_{16}$ and ELG resistor layer $70_0$. ELG resistor layer $70_{16}$ are laid out in FIGS. 4 and 9 oriented perpendicularly to the planar substrate surface 50. It will also be understood that the leads and layers may also be deposited in a fan-like pattern roughly oriented to extend for a short distance perpendicular to the interior edge deposition base lines $74_n$ or $76_n$. In this regard, it will be recalled that the illustrations of the curvature of the set back lines 80 in FIGS. 4, 5, 9, 10 are highly exaggerated, and that the fan orientation would, in fact, be slight and not necessarily affect the pitch between the head elements and the resulting track pitch. One such fan pattern is depicted in FIG. 15 and described below.

In a further embodiment, the thin film head elements are individually fabricated and fixed in position to approximately match the eventual convex cross-curvature of the head bearing surfaces. The mounting pattern is in a fan like array approximately following the set back line 80 of the sixth order polynomial y(x) equation.

In the preferred embodiments, at least one and preferably two electronic lapping guides (ELGs) $70_0$ and $70_{16}$ are included in the head pattern that is photo-lithographically deposited on a substrate 48 wafer surface. The ELGs $70_0$ and $70_{16}$ are accurately deposited with respect to the set backs $D_0'$ and $D_{16}'$ of the end ELG resistor layers $70_0$ and $70_{16}$, respectively, prior to in-situ lapping. The ELGs resistor layers $70_0$, $70_{16}$ provide closed-loop dimensional feedback on the gap depth or element height $D_n$ of the recording head defining layers $62_1$–$62_{15}$ during the in-situ lapping or contouring operation. As the recording head bearing surface is lapped or contoured, the ELG resistor layer heights $D_0$ and $D_{16}$ decrease, resulting in an increase in ELG resistance that is inversely proportional to the height. Given that the ELG resistor layers $70_0$, $70_{16}$ are deposited accurately on substrate 48 with respect to the adjacent head gap layers and the set back line 80, the ELG resistance change can thus be cross-correlated with the actual gap depths or element heights $D_n$ of the head layers.

To maximize the benefit and accuracy of the ELG as a process monitor for the radially arrayed or stepped thin film head depositions described above, the ELG resistor layers $70_0$ and $70_{16}$ are patterned at their deposition base lines $72_0$ and $72_{16}$, respectively, to follow the predetermined arc or stepped set back pattern of the convex cross-curvature of the head surface contour and the set back line 80. Typically, ELG's are deposited in linear rows and columns with the linearly deposited head element thin film layers. With the head surface contour described above, ELG resistor layers deposited with an edge parallel to substrate surface 50 would be inaccurate and possibly even partly or wholly severed and opened in the final head in-situ lapping process.

Figure 12:
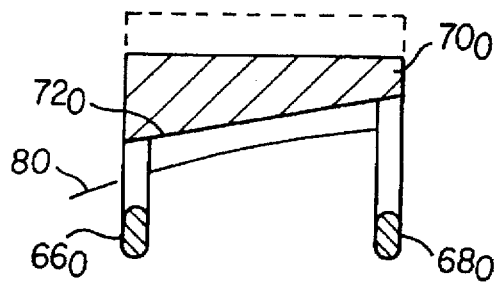
Figure 13:
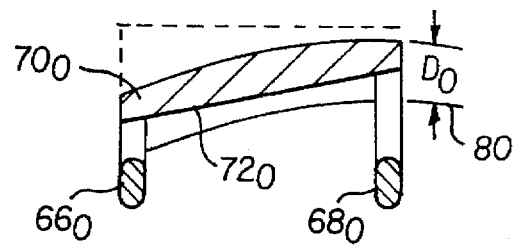

In one embodiment, the ELG resistor layers $70_0$ and $70_{16}$ are patterned in a trapezoidal shape by angling the deposition base lines $72_0$ and $72_{16}$ as shown in the second embodiment of FIGS. 9–13. The trapezoid dimensions and positioning are chosen such that when the surface of the linear head array 30 is final contoured as shown in FIG. 13, the deposition base lines $72_0$ and $72_{16}$ of the ELG resistor layers $70_0$ and $70_{16}$ are parallel to the tangent of the head surface contour and the set back line 80. This latter embodiment enables using the ELGs in an initial lapping operation to provide the transverse contour of the linear head array surface as shown in FIG. 12 as well as the final contouring operation resulting in the contour in the direction of the linear head array as shown in FIG. 13.

Figure 6:
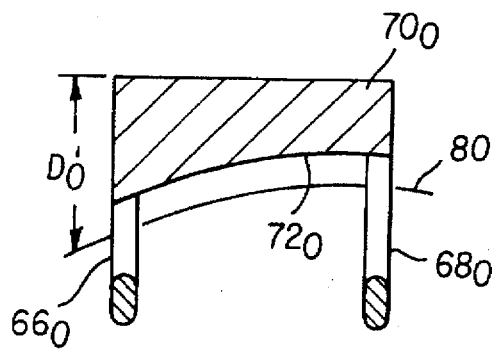
FIGS. 6–8 are simplified cross-section views of the steps of lapping of the outermost electronic lapping guides and dummy head elements of the first embodiment of the head array.
Figure 7:
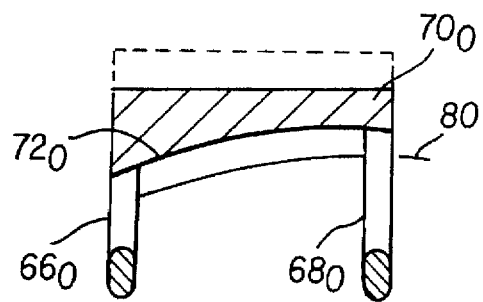
Figure 8:
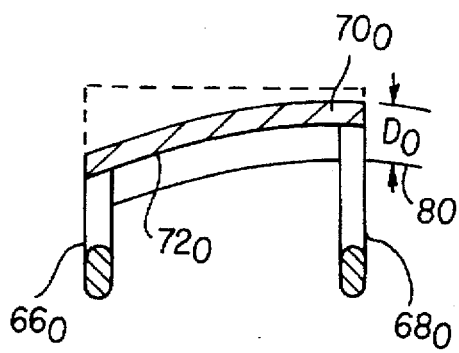
Figure 11:
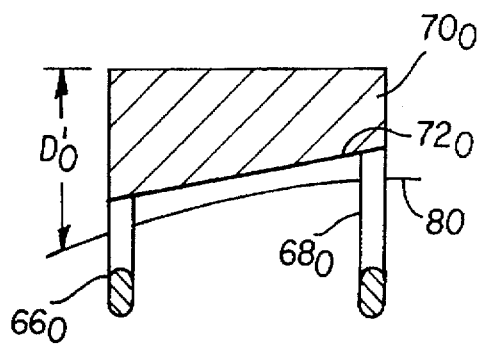
FIGS. 11–13 are simplified cross-section views of the steps of lapping of the outermost electronic lapping guides and dummy head elements of the second embodiment of the head array.

FIGS. 6–8 show a further improvement on the generally trapezoidal shaped ELG, by curving the deposition base lines $72_0$ and $72_{16}$ of the ELG resistor layers $70_0$ and $70_{16}$ to conform to, while being offset from, the set back line 80. The results of the initial transverse contour and the final in-situ lapping contour are shown in FIGS. 7 and 8. When final contoured, the ELG reference edge will exactly match the desired convex curvature of the head bearing surface as reflected by set back line 80. This enhances the ability to fine tune the depth of the in-situ lapping by comparing the measured resistance with a reference resistance value during the lapping process.

As depicted in FIGS. 4–13, the deposition base lines $72_0$ and $72_{16}$ of the ELG resistor layers $70_0$ and $70_{16}$ are spaced somewhat from the set back line to effect a short height. In theory, they could be co-incident with one another, but it is desired to have a shorter ELG resistor layer height to provide a relatively high resistance target within a resistance tolerance range. The resistance is measured during the lapping process and halted when the target resistance is achieved after the excess layer height is lapped away in the lapping process.

All of these embodiments are applicable toward either MR or inductive thin film heads. In the case of the MR head element, the heights $D_n$ of the head defining layers $62_n$ shown in FIGS. 4, 5 and 9, 10 are determined by the pattern of the set back line 80 and must be controlled carefully to remain within the tight tolerance range (e.g., ±0.5 microns).

An additional embodiment of the present invention that relaxes the tight element height tolerance requirement involves the use of a magnetic flux guided MR structure of the type shown in U.S. Pat. Nos. 5,258,883 and 5,291,363 or a flux guided PMR structure of the type described in the above-referenced U.S. Ser. No 08/564,751. The preferred embodiment for reading the small magnetic signals from an MOF layer comprises a PMR head structure, e.g. flux guided PMR head structure layers $64_1$–$64_{15}$ used in conjunction with a magnetic flux guides $78_1$–$78_{15}$ as shown in partial arrays in FIGS. 14 and 15.

Figure 14:
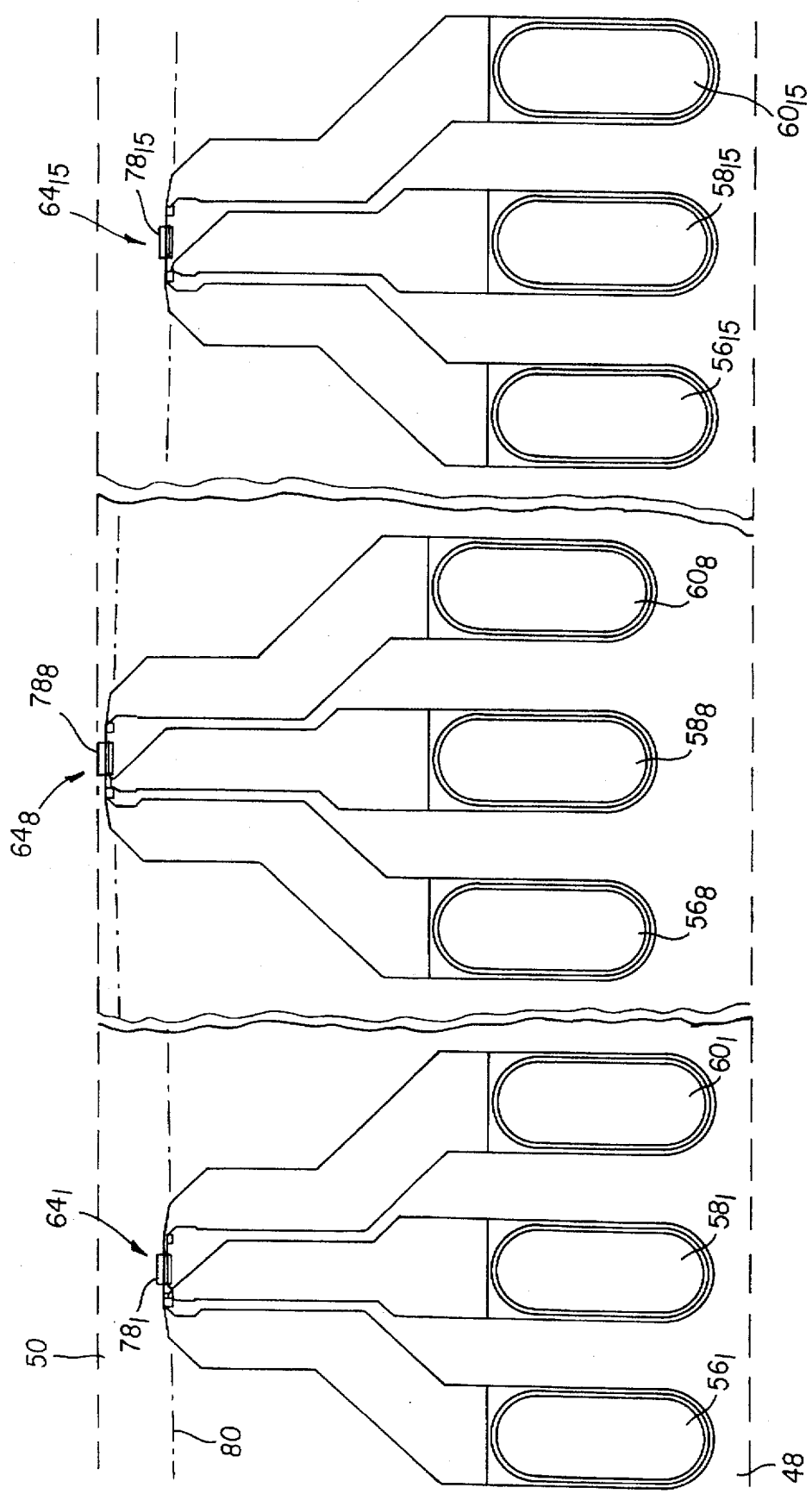
FIG. 14 is a top view of a section of a linear array of flux-guided PMR head layers also arranged in an exaggerated and staggered set back manner illustrating a further implementation of the present invention.

FIGS. 14 and 15 show top views of the end and center flux guided PMR structure layers $64_1$, $64_{15}$ and 648, respectively, laid down on a substrate 48 with respect to substrate surface 50 in a highly exaggerated set back pattern (FIG. 14) and in a highly exaggerated fan pattern (FIG. 15). The set back pattern and the fan pattern may also be employed in patterning the thin film magnetic head defining layers $62_n$ of the arrays of FIGS. 4–13 as well.

A pair of MR structures are superimposed on one another to form the PMR structure. The PMR output signals provided on leads $56_n$, $58_n$, $60_n$ are processed differentially to reduce thermal noise effects common to both MR's, increasing the signal-to-noise ratio in the detection of small signals from the MOF layers over that attained in detection from a single MR head element. The flux guides $78_n$ "conduct" magnetic flux from the media-bearing contoured head surface to the PMR structure, thereby increasing (improving) the tolerance range allowed during the process of lapping away the planar substrate surface 50. In the flux guided PMR head configuration, the magnetic flux guide material extends to the media-bearing surface, while the PMR layers remain subsurface and unexposed in the lapping process. The electrical and magnetic bias properties of the PMR element are independent of the flux guides $78_n$ and are therefore independent of the final lapped height. The overall effective magnetic "spacing loss" (a loss of signal detection which is exponential with the spacing between head and media) is reduced with the flux guides $78_n$.

A PMR head layer structure without flux guides $78_n$ must be set back from the media-bearing contoured head surface to prevent shorting between the MR pair by lapping of the head bearing surface. The result is that the latter has a tight MR element height lapping tolerance (±0.5 microns typical), chosen to minimize the distance that the PMR layers are set back.

A flux guided structure can tolerate a wider range (5.5 microns typical) in element height without significantly sacrificing signal output when used in conjunction with the arc or stepped MR deposition pattern described above with respect to FIGS. 4, 5 and 9, 10. The significance of using flux guides $78_n$ in the head structure is that they ease the lapping tolerance enough to allow for variations in the final contour achieved. Flux guides $78_n$, therefore, enable the use of the PMR structure, which provides excellent detection of the small signals from the filmstrip MOF layer.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–15 filmstrip 10
opening 12
parallel film rails 14 and 16
spring biased backing plate 18
film rail and gate frame 20
elongated channels 24 and 26
MOF layer 28
linear magnetic head array 30
frustums $32_0$–$32_{16}$
prolate ellipsoidal head contour 34
base plate 36
substrate 48
planar substrate surface 50
leads $56_n$, $58_n$, $60_n$
head element or gap defining layers $62_n$, $62_1$–$62_{15}$
PMR head layers $64_n$, $64_1$–$64_{15}$
leads $66_0$, $66_0$
leads $66_{16}$, $68_{16}$
ELG resistor layers $70_0$ and $70_{16}$
curved deposition base lines $74_n$
straight deposition base lines $76_n$
flux guides $78_1$–$78_{15}$
set back line 80

What is claimed is:

1. A thin film magnetic head array for recording and/or reproducing information in tracks of a magnetic layer on photographic filmstrip exhibiting a predetermined cross-film, concave curvature extending across the image frame area width of the filmstrip when the filmstrip is constrained in a film transport path for movement with respect to the magnetic head array comprising:

means for defining a filmstrip transport path for constraining a filmstrip to exhibit the predetermined cross-film, concave curvature;

an elongated head substrate mounted with respect to said filmstrip transport path defining means having an array length extending across the image frame area width and a head element surface adapted to contact the magnetic layer approximated by a sixth order polynomial having even terms only and complying with the convex curvature of the filmstrip constrained in the film transport path;

a plurality of magnetic head elements deposited in a linear array as thin film layers on said elongated head substrate extending between a head element layer deposition base line and the head surface and having predetermined head element heights, wherein said head element layer deposition base line is approximated by a sixth order polynomial having even terms only and complying with the convex curvature of the filmstrip constrained in the film transport path.

2. The magnetic head array of claim 1 wherein the head element predetermined layer height is controlled in the fabrication of the magnetic head array by mounting the magnetic head array in operating relation to a guiding means and lapping the head surfaces with an abrasive strip exhibiting the filmstrip cross film concave curvature passed through said guiding means in the path of transport of said filmstrip to lap down the head surface into a curvature conforming with said convex curvature.

3. The magnetic head array of claim 1 wherein the magnetic head elements of the magnetic head array further comprise compound, three-dimensional bearing surfaces further comprising a plurality of shallow frustums mounted in a linear array in the cross-film direction each supporting a head element layer and shaped to create localized pressure regions when penetrated into the concave curvature of the filmstrip.

4. The magnetic head array of claim 1 wherein the magnetic head array elements comprise thin film, magnetoresistive reproduce heads deposited in thin film layers on said elongated head substrate.

5. The magnetic head array of claim 1 wherein the magnetic head elements are deposited on the substrate having stepped height offsets between adjacent head elements arranged in such a manner as to approximate the convex curvature of the head element layer deposition base line.

6. The magnetic head array of claim 5 wherein the final head surface is contoured to match the convex curvature of the head layer deposition base line to equalize the head layer heights of all of the magnetic head element layers.

7. The magnetic head array of claim 1 wherein the magnetic head elements are deposited on the substrate in a fan array such that the adjacent head elements are arranged in such a manner as to approximate the convex curvature of the head element layer deposition base line.

8. The magnetic head array of claim 7 wherein the magnetic head array elements comprise thin film, paired magnetoresistive reproduce heads deposited in thin film layers on said elongated head substrate with flux guides formed between the paired magnetoresistive reproduce heads and the head surface.

9. The magnetic head array of claim 1 wherein the magnetic head array elements comprise thin film, paired magnetoresistive reproduce heads deposited in thin film layers on said elongated head substrate with flux guides formed between the paired magnetoresistive reproduce heads and the head surface.

10. The magnetic head array of claim 9 wherein the magnetic head elements are deposited on the substrate having stepped height offsets between adjacent head elements arranged in such a manner as to approximate the convex curvature of the head element layer deposition base line.

11. The magnetic head array of claim 1 further comprising at least one electrical lapping guide deposited on the substrate in relation to the linear array of magnetic head elements and in conformance with the convex curvature of the head surface and wherein the head element layer height is controlled in the head fabrication processing by monitoring the electrical resistance of the electrical lapping guide during shaping of the convex curvature of the head element surface.

12. The magnetic head array of claim 11 wherein the electronic lapping guide is trapezoidal shaped when deposited, so as to culminate in, approximately, a parallelogram when final contoured with the convex curved head bearing surface.

13. The magnetic head array of claim 11 wherein the electronic lapping guide is deposited with a reference base line exactly matching and parallel to the desired convex curved pattern, so that the electronic lapping guide culminates in a parallelogram when contoured with the convex curved head bearing surface.

14. The magnetic head array of claim 1, wherein the sixth order polynomial is represented by $y(x)=a_0+a_2x^2+a_4x^4+a_6x^6$, where $y(x)$ is the convex curvature of the head layer deposition base line as a function of the distance x along the magnetic head array from the centermost of the magnetic head elements that approximates the convex curvature, and the constants are within the ranges:

$a_2 = -3.15 \times 10^{-4}$ to $-2.11 \times 10^{-4}$ mm$^{-1}$;

$a_4 = 6.50 \times 10^{-6}$ to $9.41 \times 10^{-6}$ mm$^{-3}$; and $a_6 = -1.59 \times 10^{-7}$ to $-1.297 \times 10^{-7}$ mm$^{-5}$.

15. The magnetic head array of claim 14 wherein the magnetic head elements are deposited on the substrate having stepped height offsets between adjacent head elements arranged in such a manner as to approximate the convex curvature of the head element layer deposition base line.

16. The magnetic head array of claim 15 wherein the final head surface is contoured to match the convex curvature of the head layer deposition base line to equalize the head layer heights of all of the magnetic head element layers.

17. The magnetic head array of claim 16 further comprising at least one electrical lapping guide deposited on the substrate in relation to the linear array of magnetic head elements and in conformance with the convex curvature of the head surface and wherein the head element layer height is controlled in the head fabrication processing by monitoring the electrical resistance of the electrical lapping guide during shaping of the convex curvature of the head element surface.

18. The magnetic head array of claim 17 wherein the electronic lapping guide is trapezoidal shaped when deposited, so as to culminate in, approximately, a parallelogram when final contoured with the convex curved head bearing surface.

19. The magnetic head array of claim 17 wherein the electronic lapping guide is deposited with a reference base line exactly matching and parallel to the desired convex curved pattern, so that the electronic lapping guide culminates in a parallelogram when contoured with the convex curved head bearing surface.

20. The magnetic head array of claim 17 wherein the head element predetermined layer height is controlled in the fabrication of the magnetic head array by mounting the magnetic head array in operating relation to a guiding means and lapping the head surfaces with an abrasive strip exhibiting the filmstrip cross film concave curvature passed through said guiding means in the path of transport of said filmstrip to lap down the head surface into a curvature conforming with said convex curvature.

21. The magnetic head array of claim 20 wherein the magnetic head elements of the magnetic head array further comprise compound, three-dimensional bearing surfaces further comprising a plurality of shallow frustums mounted in a linear array in the cross-film direction each supporting a head element layer and shaped to create localized pressure regions when penetrated into the concave curvature of the filmstrip.

22. The magnetic head array of claim 21 wherein the magnetic head array elements comprise thin film, magnetoresistive reproduce heads deposited in thin film layers on said elongated head substrate.

* * * * *